US006157997A

United States Patent [19]
Oowaki et al.

[11] Patent Number: 6,157,997
[45] Date of Patent: Dec. 5, 2000

[54] PROCESSOR AND INFORMATION PROCESSING APPARATUS WITH A RECONFIGURABLE CIRCUIT

[75] Inventors: Yukihito Oowaki, Kanagawa; Hiroshige Fujii; Masatoshi Sekine, both of Tokyo, all of Japan

[73] Assignee: Kabushiki Kaisha Toshiba, Kawasaki, Japan

[21] Appl. No.: 09/038,834

[22] Filed: Mar. 12, 1998

[30] Foreign Application Priority Data

Mar. 13, 1997 [JP] Japan ..................................... 9-059566

[51] Int. Cl.⁷ ..................................................... G06F 9/318
[52] U.S. Cl. ........................... 712/226; 712/209; 712/229
[58] Field of Search ................... 712/248, 226, 712/209, 229

[56] References Cited

U.S. PATENT DOCUMENTS

| | | | |
|---|---|---|---|
| 3,478,322 | 11/1969 | Evans ....................................... | 712/248 |
| 3,889,242 | 6/1975 | Malmer, Jr. .............................. | 712/226 |
| 4,236,204 | 11/1980 | Groves .................................... | 712/226 |
| 4,346,438 | 8/1982 | Potash et al. ............................ | 712/226 |
| 5,345,570 | 9/1994 | Azekawa .................................. | 712/248 |
| 5,790,843 | 8/1998 | Borkenhagen et al. ................. | 712/226 |
| 5,862,370 | 1/1999 | Dockser .................................. | 712/226 |
| 5,930,489 | 7/1999 | Bartkowiak et al. .................... | 712/211 |

OTHER PUBLICATIONS

Michael Butts, "Future Directions of Dynamically Reprogrammable Systems", IEEE Custom Integrated Circuits Conference, May 1995, pp. 487–494.

DeHon, André, Transit Note #118, Notes on Coupling Processors with Reconfigurable Logic, MIT Transit Project, Mar. 21, 1995.

DeHon, André, DPGA–Coupled Microprocessors: Commodity ICs for the Early 21st Century, FCCM '—IEEE Workshop on FPGAs for Custom Computing Machines, Apr. 10–13, 1994.

Hastie, Neil et al., The Implementation of Hardware Subroutines on Field Programmable Gate Arrays, Proceedings of the IEEE 1990 Custom Integrated Circuits Conference, May 13–16, 1990.

Wirthlin, Michael J., The Nano Processor: a Low Resource Reconfigurable Processor, IEEE Workshop on FPGAs for Custom Computing Machines, Apr. 10–13, 1994.

*Primary Examiner*—Richard L. Ellis
*Attorney, Agent, or Firm*—Oblon, Spivak, McClelland, Maier & Neustadt, P.C.

[57] ABSTRACT

Part or all of an instruction decoder is constructed of a first reconfigurable circuit wherein a circuit structure thereof can be changed according to an external signal. Further, a second reconfigurable circuit which is connected to output side of a register file as part of processing unit and wherein a circuit structure thereof can be changed according to an external signal is preliminarily provided. For special use, to achieve a predetermined operating function, the second reconfigurable circuit is reconstructed by the external signal. Further, a particular instruction corresponding to the predetermined operating function is set, and the first reconfigurable circuit is so reconstructed by an external signal that when the particular instruction is inputted, a corresponding control signal is outputted. When the particular instruction is executed, the first reconfigurable circuit outputs a control signal and the second reconfigurable circuit executes the predetermined operating function by that control signal.

9 Claims, 6 Drawing Sheets

PROCESSOR AND INFORMATION PROCESSING APPARATUS WITH A RECONFIGURABLE CIRCUIT

BACKGROUND OF THE INVENTION

1. Field of the Invention

This invention relates to a processor containing reconfigurable circuits wherein a circuit structure thereof can be changed and information processing apparatus equipped therewith.

2. Related Art

In recent years, a style of processing data successively according to processor instructions written by software using a microprocessor has been a main stream in today's information processing apparatuses. The style of using the microprocessor has remarkable advantages in that the function can be changed by changing a software program, a plurality of functions can be achieved by the same hardware and the like. As an importance thereof has increased, the processor is demanded to carry out processing at further higher speeds.

Figure 1:
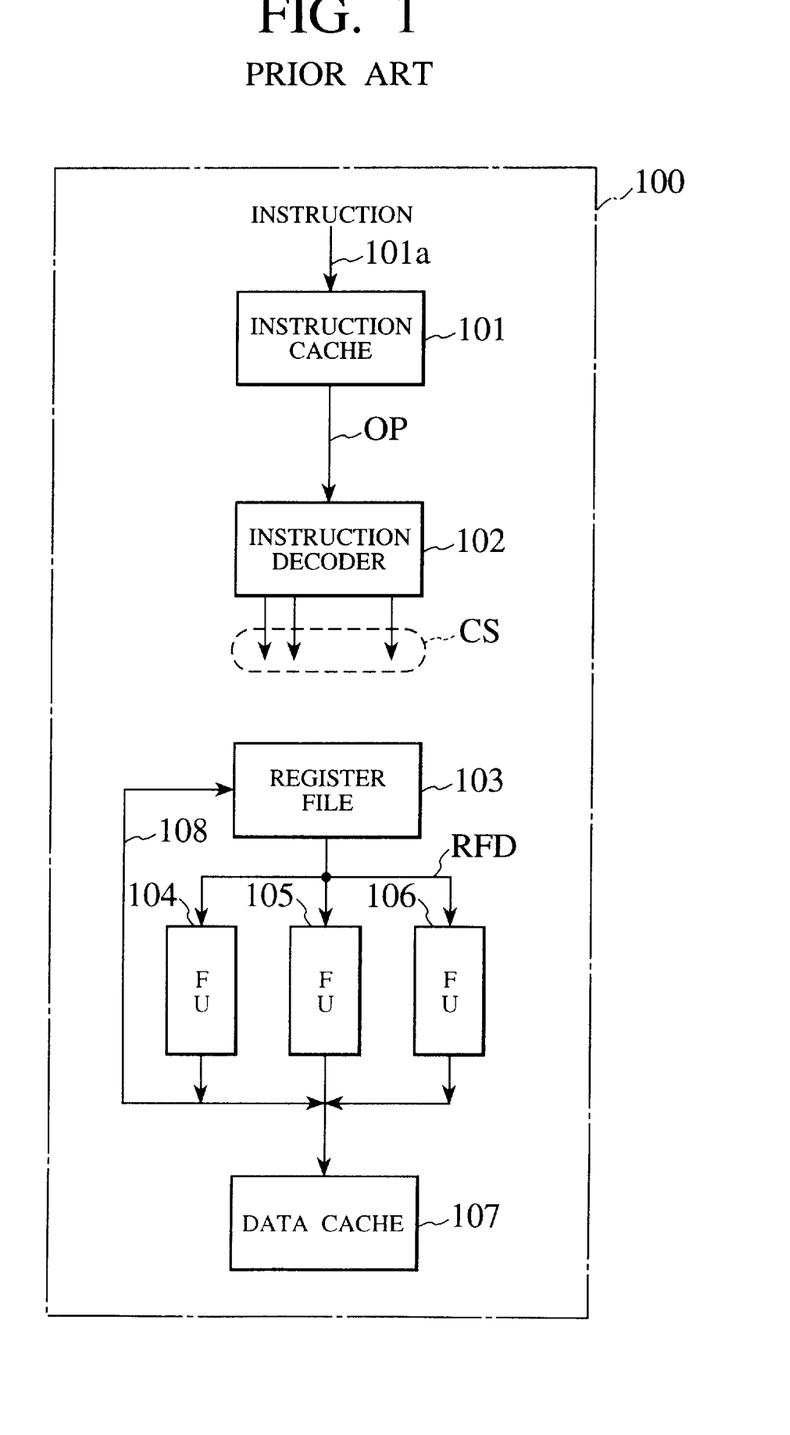
FIG. 1 is a block diagram showing a structure of major components of a conventional processor.

FIG. 1 is a block diagram showing a structure of major parts of a conventional processor.

In this processor 100, an instruction is inputted through a data bus 101a and stored in an instruction cache 101. If a predetermined instruction is read from this instruction cache 101, it is sent to an instruction decoder 102 through a bus OP and decoded there, so that a control signal is generated in bus CS. Each circuit block and bus in the processor are controlled by this control signal.

Data processing is carried out by an arithmetic operation between a register file 103 for storing source data necessary for the operation and function units(FU) 104–106. Data of the register file 103 is supplied to the function units 104–106 through bus RFD and a result of the operation is written back to the register file 103 through the bus 108. Data of the register file 103 is loaded and stored in the data cache 107 and vice versa. A processing unit comprises the function units 104, 105, 106, data cache 107 and data bus 108.

Although an arithmetic operation is carried out in the function units(FU) 104–106, only function units which are most frequently used are materialized as hardware to avoid an increase of chip area. That is, the function units 104-106 are constructed with arithmetic logic unit (ALU), floating point unit (FPU) and the like.

Because a user utilizes its own application here, installing a function unit for accelerating a particular application is effective for accelerating a particular application for individual users.

However, to reduce production cost of the processor, it is necessary to maintain a certain amount of production. A processor installed with a function unit restricted to a particular application like the aforementioned one increase its production cost because the demand therefor is lower than that for a general purpose processor. From this point of view, it is difficult to install, in the processor, a function unit oriented for a particular application. As a result, in carrying out a particular application, a sufficiently high speed cannot be achieved.

SUMMARY OF THE INVENTION

The present invention has been proposed to solve the problems described above, and an object of the present invention is to provide a processor which is capable of operating a particular application at high speeds and produced at low cost. Another object of the invention is to provide an information processing apparatus capable of achieving high speed operation of a particular application and low cost of the apparatus.

To achieve the object mentioned above, there is provided a processor comprising: an instruction decoder for decoding an instruction to be executed; a register file holding a source data necessary for executing the instruction; and a processing unit for executing the instruction using the source data according to a result of decoding of the instruction decoder and writing back a result of the execution as the source data to the register file, the instruction decoder having a first reconfigurable circuit wherein a circuit structure thereof can be changed by an external signal so as to output a first control signal when the instruction is a set particular instruction, the processing unit having a second reconfigurable circuit wherein a circuit structure thereof can be changed by the external signal so as to carry out processing based on the particular instruction when the instruction is a set particular instruction and further functioning the second reconfigurable circuit when the first control signal is inputted.

According to the present invention, user reconstructs the first and second reconfigurable circuits as required, and sets a particular instruction corresponding to the second reconfigurable circuit. As a result, a dedicated circuit for a particular application can be realized on site, so that high speed operation is achieved in carrying out the particular application. Further, this can cope with other applications, thereby achieving mass production effect.

Further to achieve the object mentioned above, there is provided an information processing apparatus comprising: a memory storing instructions and data; a processor for executing an instruction read from the memory; a reconfigurable circuit reconstructed to a dedicated operating circuit for executing a particular operating function; and a control circuit which, upon detecting an activated value in a particular space in the memory during execution of the instruction, controls so as to carry out the particular operating function by means of the dedicated operating circuit.

According to the present invention, user activates a value (flag) of a particular space of the memory corresponding to a necessity of using a dedicated operating circuit in a program. During execution of this program, the control circuit always monitors the flag, and if the flag is activated, a particular function is executed by starting the dedicated operating circuit. Thus, compiler does not need to know what operating function the dedicated operating circuit has.

According to a preferred embodiment of the present invention, the control circuit sends an interruption signal to the processor when operation of the dedicated operating circuit terminates.

According to this embodiment, it is possible to surely notify the processor that operation of the dedicated operating circuit has terminated.

Further, to achieve the object mentioned above, there is provided an information processing apparatus comprising: a memory storing instructions; a processor for executing an instruction read from the memory; a plurality of reconfigurable circuits reconstructed to dedicated operating circuits for executing particular operating functions different from each other; and a plurality of control circuits which are provided corresponding to the plurality of the reconfigurable circuits respectively and, upon detecting respective activated values in respective particular spaces corresponding to the reconfigurable circuits in the memory, control so as to carry out the particular operating functions by means of the dedicated operating circuits respectively.

According to the present invention, plural kinds of operating circuits for particular purposes of high speed can be achieved on site by using the conventional compiler substantially as it is.

According to a preferred embodiment of the present invention, the plurality of control circuits send respective interruption signals to the processor when respective operations of the dedicated operating circuits terminate.

According to the present embodiment, it is possible to surely notify the processor that operation of the dedicated operating circuit has terminated.

The nature, principle and utility of the invention will become more apparent from the following detailed description when read in conjunction with the accompanying drawings.

DETAILED DESCRIPTION OF THE PREFERRED EMBODIMENTS

Figure 2:
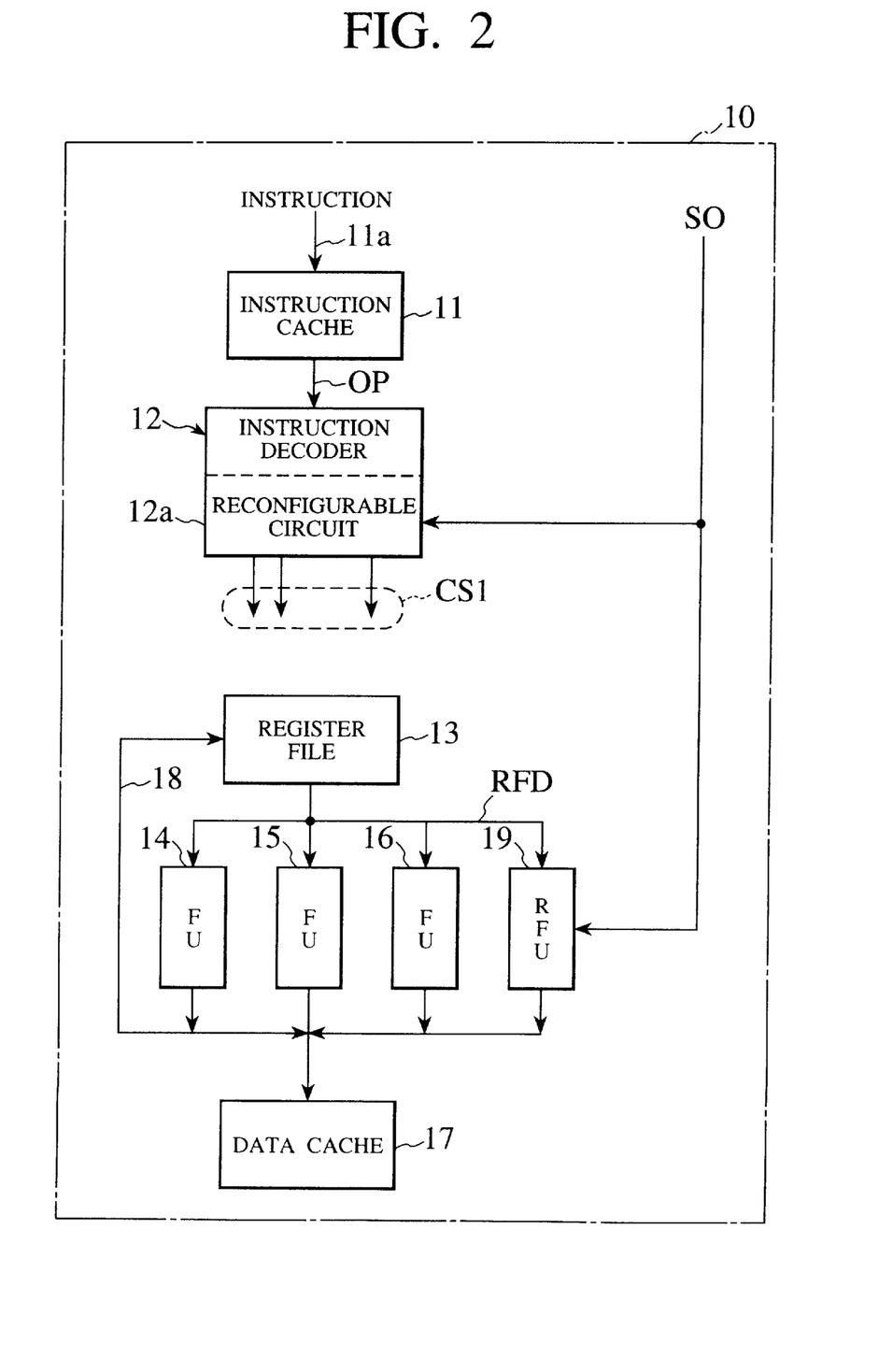
FIG. 2 is a block diagram showing a structure of major components of a processor according to a first embodiment of the present invention.

The embodiments of the present invention will be described with reference to the accompanying drawings. FIG. 2 is a block diagram showing a structure of major parts of a processor according to a first embodiment of the present invention.

In this processor, part or all of an instruction decoder 12 is constructed with a reconfigurable circuit 12a in which a circuit structure thereof can be changed according to an external signal SO. In this processing unit, a reconfigurable function unit(RFU) 19 composed of a reconfigurable circuit is provided as well as ordinary function units(FU).

Referring to FIG. 2, an instruction cache 11, register file 13, function units(FU) 14, 15, 16, data cache 17 and data bus 18 correspond to respective components 101, 103–108 of a conventional processor shown in FIG. 1. Although not shown, the processor of the present embodiment contains a program counter, incremental circuit, memory management unit and the like.

Figure 3:
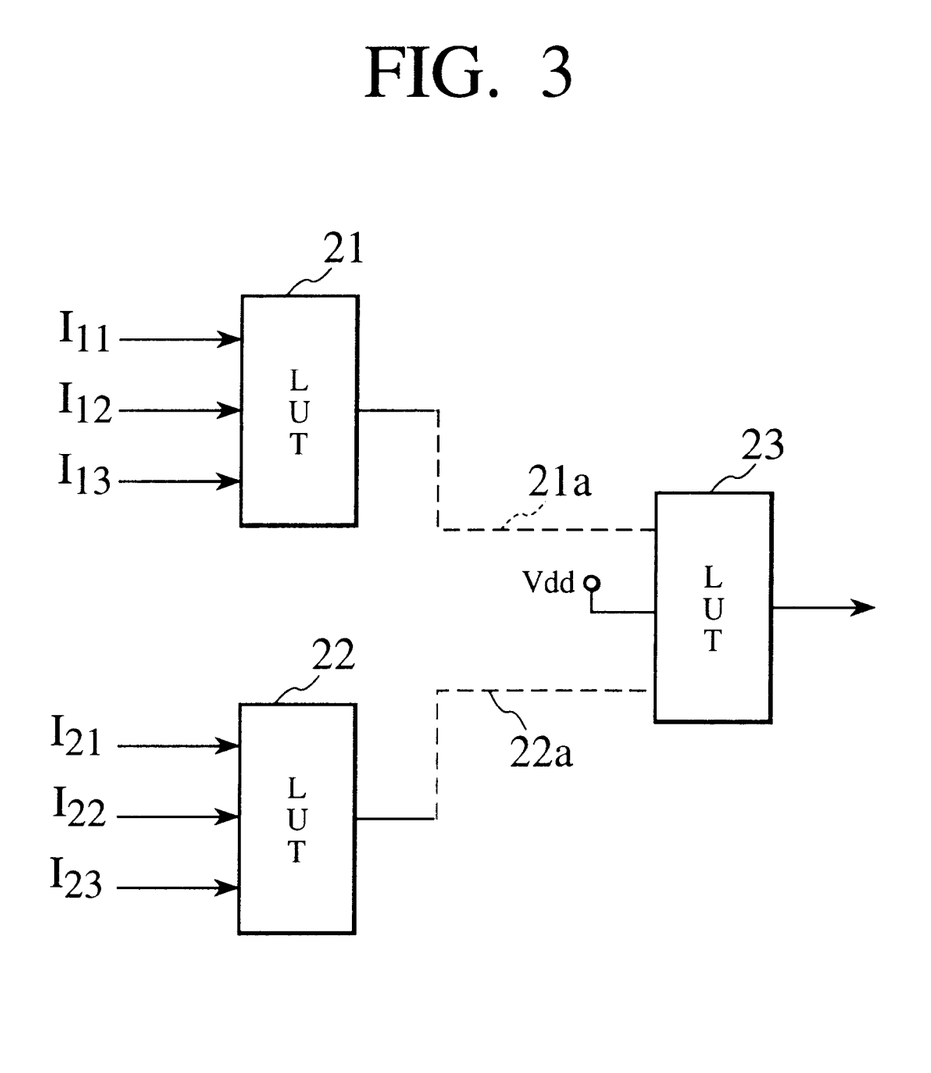
FIG. 3 is a diagram for explaining an example of structure of a reconfigurable function unit.

FIG. 3 is a diagram for explaining an example of structure of the RFU 19.

The RFU 19 is structured by connecting a plurality of 3-input look-up tables(LUT). Each of the 3-input look-up tables 21, 22, 23 is composed of an EEPROM and so structured that "1" is set only corresponding to a particular combination of three inputs. Here, what input vector sets "1" are reconfigurable depends on data to be written into a table. By connecting the plurality of the LUTs, a multiple input circuit is structured. Connecting lines 21a, 22a for the multiple connections are programmable.

Next, an operation of the first embodiment will be described.

A user constructs the RFU 19 so as to achieve his desired operating function and adds an instruction using this RFU 19 in an instruction set. Further, the reconfigurable circuit 12a in the instruction decoder 12 is reconstructed so that this added instruction is decoded appropriately and then respective circuits and buses in the processor 10 are controlled. Further, a compiler is changed so as to compile the added instruction. Then, by compiling a source program using this compiler, a program for operating this processor chip 10 is obtained.

A case in which the RFU 19 is constructed, for example, as an operating circuit for cosine conversion will be described below.

A desired instruction, for example, an instruction relating to cosine conversion is inputted from the main memory through data bus 11a and stored in the instruction cache 11. An instruction address read from a program counter is incremented by an incremental circuit and that instruction address is sent to the instruction cache 11 and memory management unit.

When the instruction cache 1 contains an instruction stored in its instruction address, or in brief, when the instruction cache 11 is hit, an instruction of an appropriate address is read and sent to an instruction decoder 12. Unless the instruction cache 11 is hit, an instruction must be read from an external memory. Thus, the external memory is accessed through a bus interface and data is read out. The aforementioned instruction sent to the instruction decoder 12 is converted to a control signal and then outputted to bus CS1.

Respective circuit blocks and buses are controlled by this control signal CS1. Data processing relating to the cosine conversion is carried out by arithmetic operation between the register file 13 and RFU 19. Data of the register file 13 is supplied to the RFU 19 through bus RFD.

A result of the operation of the RFU 19 is written to the register file 13 again through the data bus 18 or written to the data cache 17.

By reconstructing the RFU 19, for example, for cosine conversion processing, it is possible to obtain a processor in which processing often using cosine conversion such as picture compression or the like is carried out at very high speed. Further because the aforementioned processor 10 can correspond to other user's application, its mass production effect is high and low cost production is realized.

Next, a second embodiment of the present invention will be described.

In the second embodiment, basically a compiler developed for a conventional processor is used as it is, so that the same effect as the first embodiment can be obtained.

Figure 4:
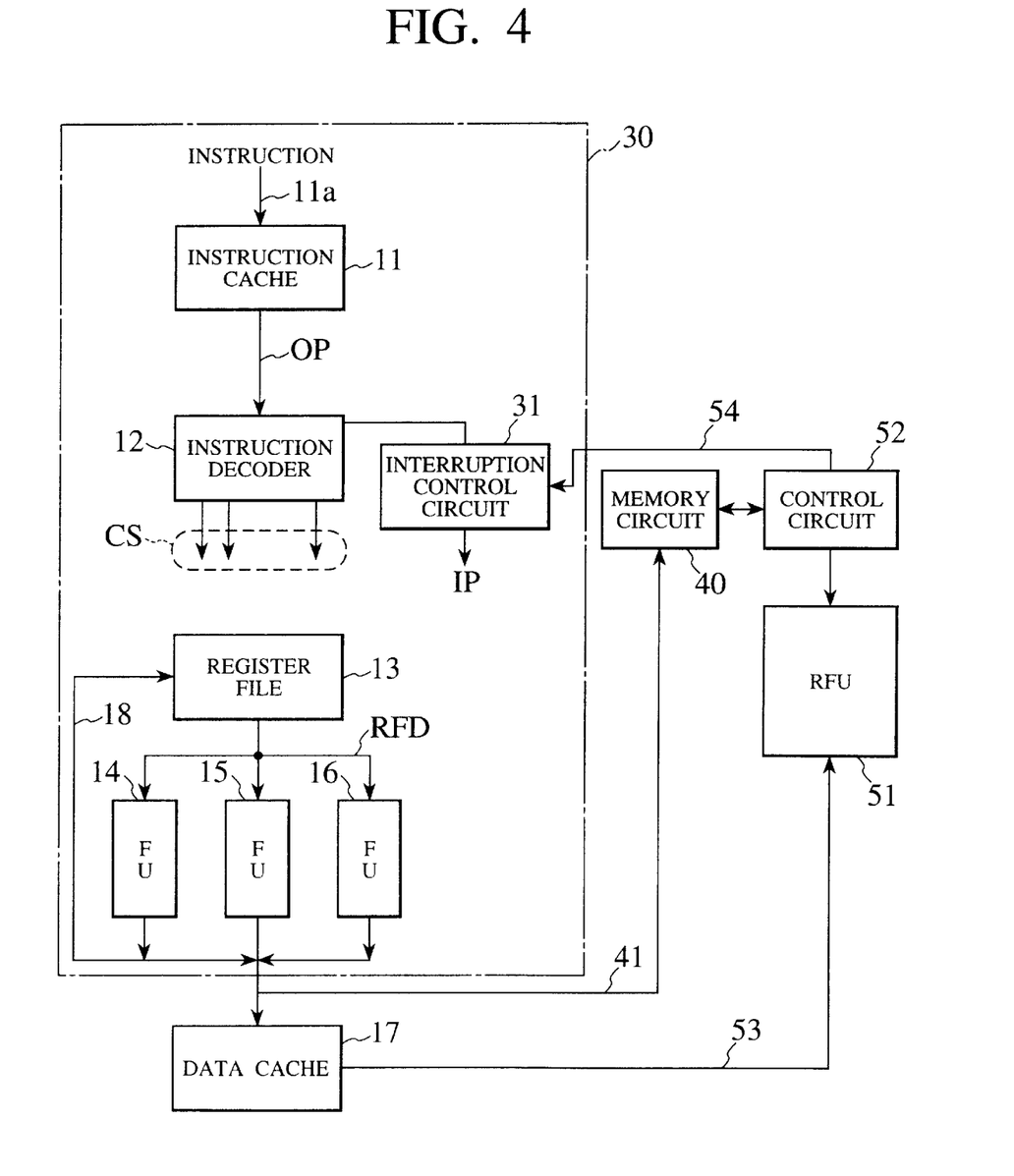
FIG. 4 is a block diagram showing a structure of major components of an information processing apparatus according to a second embodiment of the present invention.

FIG. 4 is a block diagram showing a structure of major components of an information processing apparatus according to the second embodiment.

Figure 5:
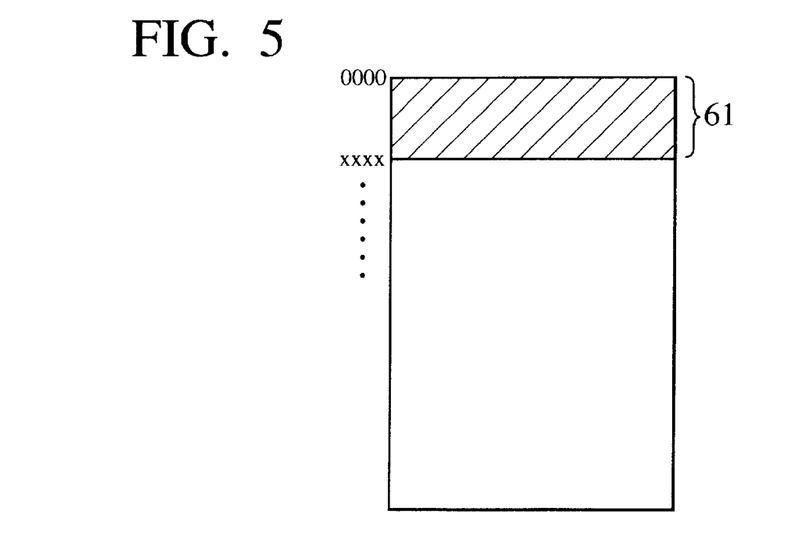
FIG. 5 is a diagram showing data portion of particular addresses in the main memory.

The processor as chip 30 has the same structure as the conventional processor and an interruption control circuit 31 for outputting an interruption signal IP is disposed in the conventional processor as well. According to this embodiment, as shown in FIG. 5, a memory circuit 40 for storing data 61 corresponding to a particular address in the main memory, a reconfigurable circuit (RFU) 51 for achieving a particular operating function, and a control circuit 52 for controlling the reconfigurable circuit 51 according to data stored in the memory circuit 40 are provided outside the processor 30.

A bus 41 is provided between the memory circuit 40 and data cache 17. A bus 53 for supplying data to the RFU 51 or storing a result of an operation to the data cache 17 is provided between the data cache 17 and RFU 51. Further, an interruption control signal line 54 is provided to interrupt the processor 30 from the control circuit 52.

As a guideline for system development, in an address space of the main memory, a particular address space (61 in FIG. 5) is secured for communication between the processor 30 and RFU 51, and if a flag of address a0 in the particular address space 61 is set, the RFU 51 is divided to n from 0 to n-1 so as to reconfigure each part, and a first RFU(0) of a formed circuit is activated and data is sent thereto.

Figure 6:
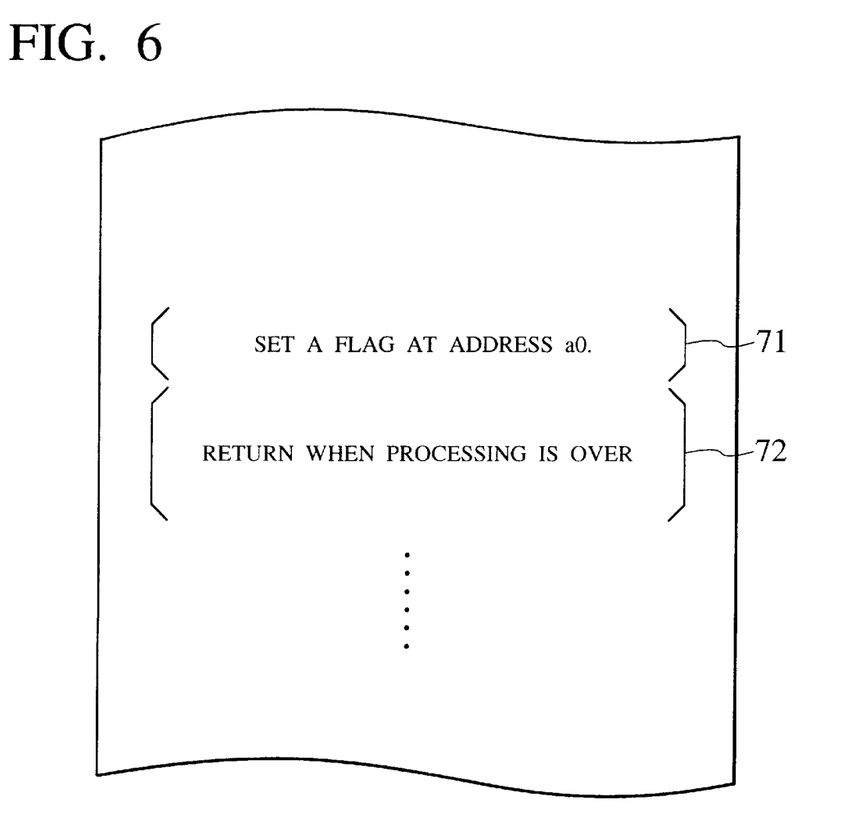
FIG. 6 is a conceptual diagram showing RFU processing section of user program according to a second embodiment.

At the time of software development, a user sets a flag in address a0 corresponding to necessity of using the RFU(0) in a program (step 71 in FIG. 6). During execution of this program, the control circuit 52 always monitors the memory 40. If the flag is set, data is sent to area RFU(0) of the RFU 51 through the bus 53. In a program for sending back a result of an operation to the bus 53, just after RFU operation terminates, the processing proceeds to a next step (step 72 in FIG. 6).

Detection of an operation termination can be carried out by counting a clock number if it has been found that the operation terminates by n clocks, for example, when the RFU is constructed. Further, operation termination at the RFU can be carried out by interrupting the processor 30 through the signal line 54.

Figure 7:
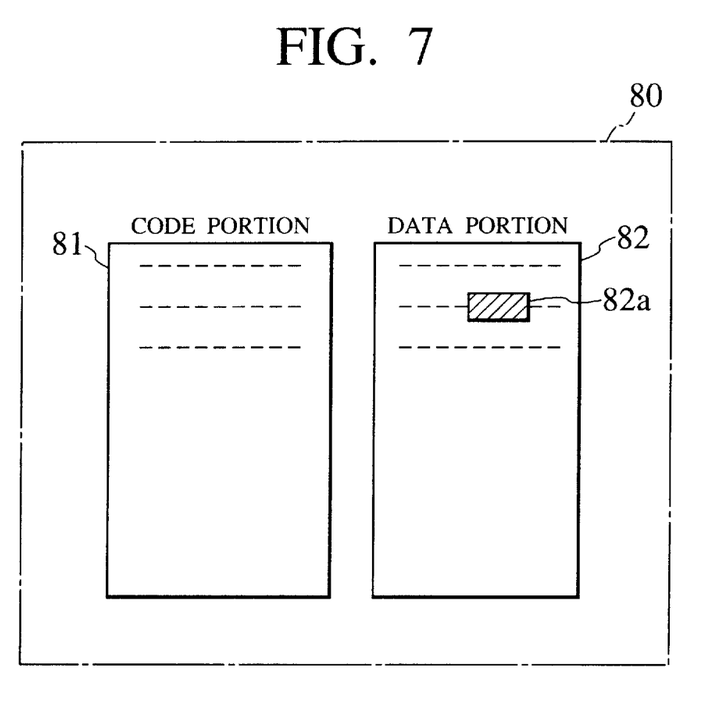
FIG. 7 is a conceptual diagram showing a structure of compiler.

Thus, the compiler does not have to know what operating function the RFU 51 has. As shown in FIG. 7, a result of the compiling is divided into an instruction portion or code portion 81 and data portion 82. In the above system, without handling the instruction set of the code portion 81, only the data portion (82a in FIG. 7: ADDRESS a0) is used for control of the RFU 51. Thus, the compiler does not need to be modified, but it is possible to use the conventional compiler substantially as it is.

Although according to the second embodiment, the memory space 61 is assigned to the memory circuit 40, if it is so constructed that the data cache 17 can be referred to according to main memory address from the control circuit 52, the memory circuit 40 can act as the data cache 17 at the same time.

Thus, according to the second embodiment, it is possible to achieve a processor having a user oriented high speed operating function without changing the compiler at a low cost.

The information processing apparatus described above is desired to be formed on a chip.

Next, a third embodiment of the present invention will be described.

According to the present embodiment, the hardware structure of the second embodiment is constructed using a plurality of RFU chips.

Figure 8:
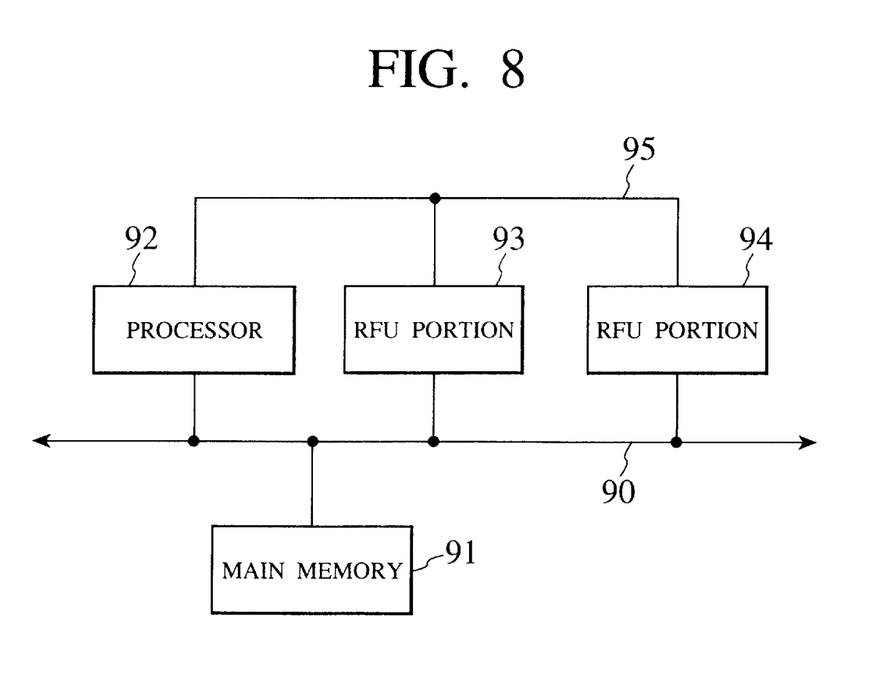
FIG. 8 is a block diagram showing a structure of major components of an information processing apparatus according to a third embodiment of the present invention.

FIG. 8 is a block diagram showing a structure of major components of an information processing apparatus according to the third embodiment of the present invention.

In this information processing apparatus, a main memory 91 storing an instruction, a processor (including data cache) 92 having the same structure as the conventional type, and RFU portions 93, 94 for carrying out particular operating functions different from each other are connected to system bus 90.

The RFU portions 93, 94 each contain the RFU 51, control circuit 52 and memory circuit 40 according to the second embodiment, and carry out the same action as the second embodiment. A particular address of the main memory 91 is used for communication for starting the RFUs 93, 94 and an interruption to the processor 92 is achieved by attaching a dedicated signal line 95.

According to the third embodiment, it is possible to realize an information processing apparatus having plural kinds of particular application operating circuits of high speeds by using the conventional compiler as it is, at a low cost.

It should be understood that many modifications and adaptations of the invention will become apparent to those skilled in the art and it is intended to encompass such obvious modifications and changes in the scope of the claims appended hereto.

What is claimed is:

1. An information processing apparatus comprising:
    a processor including an instruction decoder for decoding an instruction to be executed and at least one function unit for executing the instruction using source data according to a result of decoding of the instruction decoder;
    a reconfigurable circuit provided outside the processor and reconfigured to a dedicated operating circuit for executing a particular operating function;
    a memory assigned with a part of addresses in an address space of a main memory; and
    a control circuit provided outside the processor, for monitoring the memory during the execution of instructions by the processor and, when an activated value in a particular area in the memory is detected, activating the reconfigured circuit instead of the at least one function unit in the processor and controlling the reconfigured circuit to execute the particular operating function.

2. An information processing apparatus according to claim 1, wherein the control circuit sends an interruption signal to the processor to inform the processor that an operation by the reconfigured circuit is terminated.

3. An information processing apparatus according to claim 1, wherein the reconfigurable circuit is divided to execute a plurality of particular operating functions,
    the memory includes a plurality of particular areas which correspond to the plurality of particular operating functions, and
    the control circuit, when an activated value in any of the plurality of particular areas is detected, controls the reconfigured circuit to execute a particular operating function corresponding to a particular area including the detected activated value.

4. An information processing apparatus according to claim 1, wherein the memory includes an instruction code area and an data area, and the data area includes the particular area.

5. An information processing apparatus according to claim 1, wherein a data cache memory doubles as the memory.

6. An information processing apparatus comprising:
    a processor including an instruction decoder for decoding an instruction to be executed and at least one function unit for executing the instruction using source data according to a result of decoding of the instruction decoder;

a plurality of reconfigurable circuits provided outside the processor and reconfigured to a plurality of dedicated operating circuits for executing particular operating functions which are different from each other;

a memory assigned with a part of addresses in an address space of a main memory; and a plurality of control circuits respectively provided outside the processor and provided corresponding to the plurality of reconfigurable circuits, each control circuit monitoring the memory during the execution of instructions by the processor and, when an activated value in a corresponding one of a plurality of particular areas is detected, activating a corresponding reconfigured circuit instead of the at least one function unit in the processor and controlling the corresponding reconfigured circuit to execute a corresponding particular operating function.

7. An information processing apparatus according to claim 6, wherein each control circuit sends an interruption signal to the processor to inform the processor that an operation by the corresponding reconfigured circuit is terminated.

8. An information processing apparatus according to claim 6, wherein the memory includes an instruction code area and a data area, and the data area includes the plurality of particular areas.

9. An information processing apparatus according to claim 6, wherein a data cache memory doubles as the memory.

\* \* \* \* \*

UNITED STATES PATENT AND TRADEMARK OFFICE
CERTIFICATE OF CORRECTION

PATENT NO. : 6,157,997
DATED : December 5, 2000
INVENTOR(S) : Yukihito Oowaki, et al.

It is certified that error appears in the above-identified patent and that said Letters Patent is hereby corrected as shown below:

Title page,
Item [54], and at the top of Column 1, the title should be:
-- [54] PROCESSOR WITH EXTERNALLY PROVIDED RECONFIGURABLE CIRCUIT ACTIVATED BY WRITING DATA INTO A PREDEFINED MEMORY ADDRESS --

Signed and Sealed this

Twenty fifth Day of September, 2001

Attest:

NICHOLAS P. GODICI
*Attesting Officer*  *Acting Director of the United States Patent and Trademark Office*